(12) United States Patent
Sekiguchi et al.

(10) Patent No.: US 11,163,632 B2
(45) Date of Patent: Nov. 2, 2021

(54) LOG TRANSMISSION APPARATUS AND LOG COLLECTION SYSTEM

(71) Applicant: CLARION CO., LTD., Saitama (JP)

(72) Inventors: Takaaki Sekiguchi, Tokyo (JP); Megumi Tsuchiyama, Saitama (JP); Yasushi Nagai, Saitama (JP)

(73) Assignee: CLARION CO., LTD., Saitama (JP)

( * ) Notice: Subject to any disclaimer, the term of this patent is extended or adjusted under 35 U.S.C. 154(b) by 168 days.

(21) Appl. No.: 16/329,913

(22) PCT Filed: Apr. 18, 2017

(86) PCT No.: PCT/JP2017/015517
§ 371 (c)(1),
(2) Date: Mar. 1, 2019

(87) PCT Pub. No.: WO2018/047398
PCT Pub. Date: Mar. 15, 2018

(65) Prior Publication Data
US 2019/0196898 A1 Jun. 27, 2019

(30) Foreign Application Priority Data
Sep. 12, 2016 (JP) .............................. JP2016-177323

(51) Int. Cl.
*G06F 11/07* (2006.01)
*G06F 11/34* (2006.01)
(52) U.S. Cl.
CPC .......... *G06F 11/0778* (2013.01); *G06F 11/07* (2013.01); *G06F 11/0709* (2013.01); *G06F 11/0751* (2013.01); *G06F 11/34* (2013.01)

(58) Field of Classification Search
CPC .. G06F 11/0751; G06F 11/0709; G06F 11/34; G06F 11/3476; G06F 11/0778; G06F 11/07; H04L 41/0631
See application file for complete search history.

(56) References Cited

U.S. PATENT DOCUMENTS 8,880,946 B2 * 11/2014 Ishiou ................. G06F 11/0751
714/26
10,027,534 B1 * 7/2018 Mahapatra .......... H04L 43/0817
(Continued)

FOREIGN PATENT DOCUMENTS

EP          2492771 A2    8/2012
JP      2006-099745 A     4/2006
(Continued)

OTHER PUBLICATIONS

International Search Report, PCT/JP2017/015517, dated Aug. 1, 2017, 2 pgs.
(Continued)

*Primary Examiner* — Yolanda L Wilson
(74) *Attorney, Agent, or Firm* — Volpe Koenig

(57) ABSTRACT

A log transmission apparatus is a log transmission apparatus connected to a log collection apparatus via a communication network, and includes an application execution unit which outputs a log, an environment change management unit which generates an environment code as information indicating a change in a state of the log transmission apparatus, and a transmission unit which transmits the log and the environment code to the log collection apparatus, in which the environment change management unit generates the environment code indicating a change in the state during a period from a previous output to present output of the log by the application execution unit.

15 Claims, 22 Drawing Sheets

(56) References Cited

U.S. PATENT DOCUMENTS

| | | | |
|---|---|---|---|
| 2003/0204590 A1 | 10/2003 | Torii | |
| 2006/0048004 A1 | 3/2006 | Kawashima | |
| 2010/0162269 A1* | 6/2010 | Lucas | G06F 11/0793 |
| | | | 719/318 |
| 2013/0227352 A1* | 8/2013 | Kumarasamy | G06F 11/1461 |
| | | | 714/47.1 |
| 2013/0332430 A1* | 12/2013 | Margalit | G06F 9/542 |
| | | | 707/695 |
| 2015/0193326 A1 | 7/2015 | Elliott et al. | |
| 2016/0204992 A1 | 7/2016 | Wu et al. | |
| 2017/0010930 A1* | 1/2017 | Dutta | G06F 11/0772 |
| 2017/0010931 A1* | 1/2017 | Agarwal | G06F 11/0727 |
| 2017/0070415 A1* | 3/2017 | Bell | H04L 41/069 |
| 2017/0310537 A1* | 10/2017 | Henry | H04L 41/069 |

FOREIGN PATENT DOCUMENTS

| | | |
|---|---|---|
| JP | 2006-221538 A | 8/2006 |
| JP | 2012-203431 A | 10/2012 |
| JP | 2014-098994 A | 5/2014 |
| JP | 2016-048433 A | 4/2016 |

OTHER PUBLICATIONS

Partial Supplementary European Search Report dated May 4, 2020 for the European Patent Application No. 17848345.9.
Extended European Search Report dated Sep. 8, 2020 for the European Patent Application No. 17848345.9.

* cited by examiner

FIG. 5

| TIME (621) | VERBOSE MESSAGE (622) | 620 |
|---|---|---|
| : | : | |
| 2015-10-03<br>T03:15.32.765 | HTTP REQUEST<br>METHOD: GET<br>URL: http://example.com/nearby_restaurant.html | |
| 2015-10-03<br>T03:15.33.423 | HTTP RESPONSE<br>STATUS CODE: 200<br>OK | |
| 2015-10-03<br>T03:15:33.686 | SCREEN TRANSITION<br>SCREEN ID: 12 | |
| : | : | |
| 2015-10-03<br>T05:15.33.423 | SOFTWARE UPDATE<br>(Ver.100 --> Ver.101) | |
| : | : | |
| 2015-10-05<br>T01:00:47.786 | HTTP REQUEST<br>METHOD: GET<br>URL: http://example.com/nearby_restaurant.html | |
| 2015-10-05<br>T01:00:48.525 | HTTP RESPONSE<br>STATUS CODE: 400<br>Bad Request | |
| 2015-10-05<br>T01:00:48.986 | SCREEN TRANSITION<br>SCREEN ID: 14 | |
| : | : | |

FIG. 6

| ENVIRONMENT ID DEFINITION ||
|---|---|
| ENVIRONMENT ID | ITEM |
| 1 | HARDWARE |
| 2 | SOFTWARE VERSION |
| : | : |
| 1001 | DISPLAYED SCREEN ID |
| : | : |
| 2001 | COMMUNICATION PATH (1=3G/LTE、2=WiFi) |
| : | : |

630

FIG. 7
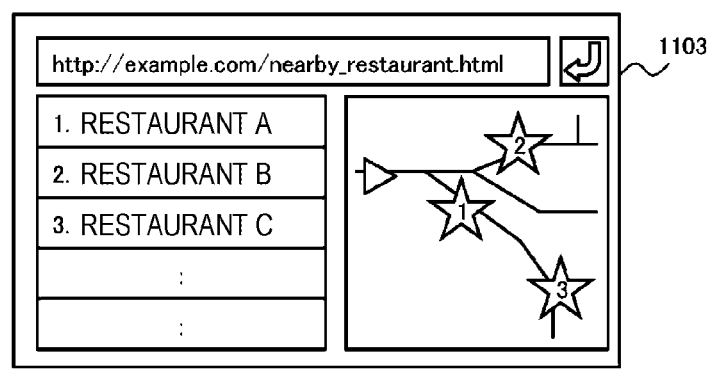
(a)
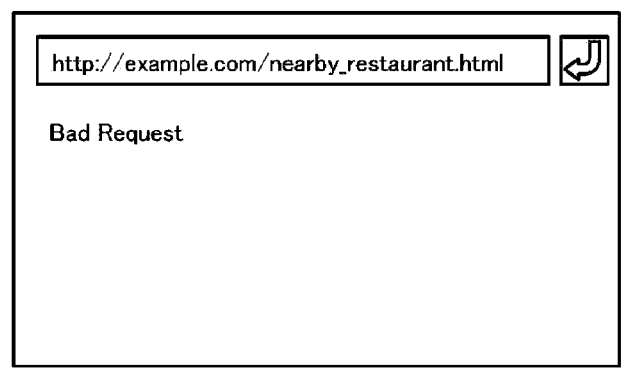
(b)

FIG. 8

VERBOSE LOG
HTTP REQUEST
METHOD: GET
URL: http://example.com/nearby_restaurant.html (a)

SUMMARY LOG
HTTP REQUEST (b)

ENVIRONMENT CODE
2-101   602

LAST COLLECTION

| ENVIRONMENT ID | ENVIRONMENT VALUE |
|---|---|
| 1 | Type-A |
| 2 | 100 |
| : | : |
| 1001 | 12 |
| : | : |
| 2001 | 1 |
| : | : |

(a)

CURRENT COLLECTION

| ENVIRONMENT ID | ENVIRONMENT VALUE |
|---|---|
| 1 | Type-A |
| 2 | 101 |
| : | : |
| 1001 | 12 |
| : | : |
| 2001 | 1 |
| : | : |

| ENVIRONMENT INFORMATION LIST ||||||
|---|---|---|---|---|
| ENVIRONMENT ID | FIRST LOG TRANSMISSION APPARATUS | SECOND LOG TRANSMISSION APPARATUS | THIRD LOG TRANSMISSION APPARATUS | FOURTH LOG TRANSMISSION APPARATUS |
| 1 | TypeA | TypeA | TypeB | TypeA |
| 2 | 101 | 101 | 101 | 100 |
| ⋮ | ⋮ | ⋮ | ⋮ | ⋮ |
| 1001 | 12 | 14 | 14 | 12 |
| ⋮ | ⋮ | ⋮ | ⋮ | ⋮ |

(a)

707

| SIMILARITY CALCULATION RESULT TABLE |||||
|---|---|---|---|---|
| ENVIRONMENT ID | WEIGHT | SECOND LOG TRANSMISSION APPARATUS | THIRD LOG TRANSMISSION APPARATUS | FOURTH LOG TRANSMISSION APPARATUS |
| 1 | 10 | 10 | 0 | 10 |
| 2 | 15 | 15 | 15 | 0 |
| ⋮ | ⋮ | ⋮ | ⋮ | ⋮ |
| 1001 | 6 | 0 | 0 | 6 |
| ⋮ | ⋮ | ⋮ | ⋮ | ⋮ |
| | TOTAL | 25 | 15 | 16 |

| VERBOSE LOG OF SECOND LOG TRANSMISSION APPARATUS ||
|---|---|
| TIME | VERBOSE MESSAGE |
| : | : |
| 2015-10-05<br>T09:37.12.020 | SOFTWARE UPDATE<br>(Ver.100 --> Ver.101) |
| : | : |
| 2015-10-05<br>T09:40:03.456 | HTTP REQUEST<br>METHOD: GET<br>URL: http://example.com/nearby_restaurant.html |
| 2015-10-05<br>T09:40:03.999 | HTTP RESPONSE<br>STATUS CODE: 400<br>Bad Request |
| : | : |

(a)

| VERBOSE LOG OF FOURTH LOG TRANSMISSION APPARATUS ||
|---|---|
| TIME | VERBOSE MESSAGE |
| : | : |
| 2015-09-20<br>T12:34.56.789 | SOFTWARE UPDATE<br>(Ver.099 --> Ver.100) |
| : | : |
| 2015-10-04<br>T06:54:32.109 | HTTP REQUEST<br>METHOD: GET<br>URL: http://example.com/nearby_restaurant.html |
| 2015-10-04<br>T06:54:32.234 | HTTP RESPONSE<br>STATUS CODE: 200<br>OK |
| : | : |

LOG TRANSMISSION REQUEST
WAS RECEIVED.
ARE YOU SURE YOU WANT TO
ACCEPT THIS REQUEST?

[ YES ]    [ NO ]

FIG. 19

| BASE ID DEFINITION TABLE | | | | | | 710 |
|---|---|---|---|---|---|---|
| BASE ID | 01 | | 02 | | ... | |
| ENVIRONMENT INFORMATION | ENVIRONMENT ID | ENVIRONMENT VALUE | ENVIRONMENT ID | ENVIRONMENT VALUE | ... | |
| | 1 | TypeA | 1 | TypeB | ... | |
| | 2 | 100 | 2 | 100 | ... | |

LOG TRANSMISSION APPARATUS AND LOG COLLECTION SYSTEM

TECHNICAL FIELD

The present invention relates to a log transmission apparatus and a log collection system.

BACKGROUND ART

When devices have failures, the log information of the devices is often referred to investigate the causes of the failures. At this time, sometimes only log information of devices having failures is insufficient to conduct effective investigations. Therefore, log information of another relevant device is also collected to carry out each investigation.

PTL 1 discloses a log collection apparatus including a graphical user interface configured to cause an operator to select a device from which logs are to be collected and logs to be collected, and a combination management unit configured to identify other logs relating to the logs selected on the graphical user interface to bring the other logs relating to the selected logs into a selected state on the graphical user interface.

CITATION LIST

Patent Literature

PTL 1: JP 2006-99745 A

SUMMARY OF THE INVENTION

Technical Problem

In the invention described in PTL 1, when a detailed log cannot be obtained from a device having a failure, it is difficult to investigate the cause of the failure.

Solutions to Problem

According to a first aspect of the present invention, a log transmission apparatus is a log transmission apparatus connected to a log collection apparatus via a communication network, and includes an application execution unit which outputs a log, an environment change management unit which generates an environment code as information indicating a change in a state of the log transmission apparatus, and a transmission unit which transmits the log and the environment code to the log collection apparatus, in which the environment change management unit generates the environment code indicating a change in the state during a period from a previous output to present output of the log by the application execution unit.

According to a second aspect of the present invention, a log collection system is a log collection system including a plurality of log transmission apparatuses and a log collection apparatus which are connected via a communication network, the log transmission apparatuses each include an application unit which outputs a log, an environment change management unit which generates an environment code as information indicating a change in a state of the log transmission apparatus, and a transmission unit which transmits the log and the environment code to the log collection apparatus, in which the environment change management unit generates the environment code indicating a change in a state during a period from a previous output to present output of the log by the application unit, and the log collection apparatus includes a failure detection unit which detects a failure by analyzing the log received from the log transmission apparatus, and a similar environment determination unit which determines another log transmission apparatus having the same or similar state by using the environment code received from the log transmission apparatus.

Advantageous Effects of Invention

According to the present invention, information necessary for detection of a failure and reproduction of a state upon occurrence of an abnormality can be obtained, and even when a detailed log cannot be obtained from a device having a failure, a log of another device which has a state similar to that of the device having a failure when the abnormality occurs can be used to investigate the cause of the failure.

BRIEF DESCRIPTION OF DRAWINGS

FIG. 5 is a table illustrating a configuration of a verbose log DB and stored information.

FIG. 6 is a table illustrating an example of environment ID definition information.

FIG. 7 is an exemplary view of a screen displayed on a display operation unit by an application execution unit.

FIG. 8(a) is a diagram illustrating an example of a verbose log, FIG. 8(b) is a diagram illustrating an example of a summary log, and FIG. 8(c) is a diagram illustrating an example of an environment code.

FIG. 10(a) is a table illustrating environment information collected in advance, and FIG. 10(b) is a table illustrating newly collected environment information.

FIG. 15(a) is a table illustrating an environment information list, and FIG. 15(b) is a table illustrating a similarity calculation result table indicating processing results.

FIG. 16 is tables illustrating examples of verbose logs.

FIG. 17 is a diagram illustrating requesting user's consent of transmission according to a first modification.

FIG. 19 is a table illustrating an example of a base ID definition table according to a second modification.

DESCRIPTION OF EMBODIMENTS

First Embodiment

Hereinafter, a log transmission apparatus and a log collection system according to a first embodiment will be described with reference to FIGS. 1 to 16.

(Overall Configuration and Outline of Invention)

Figure 1:
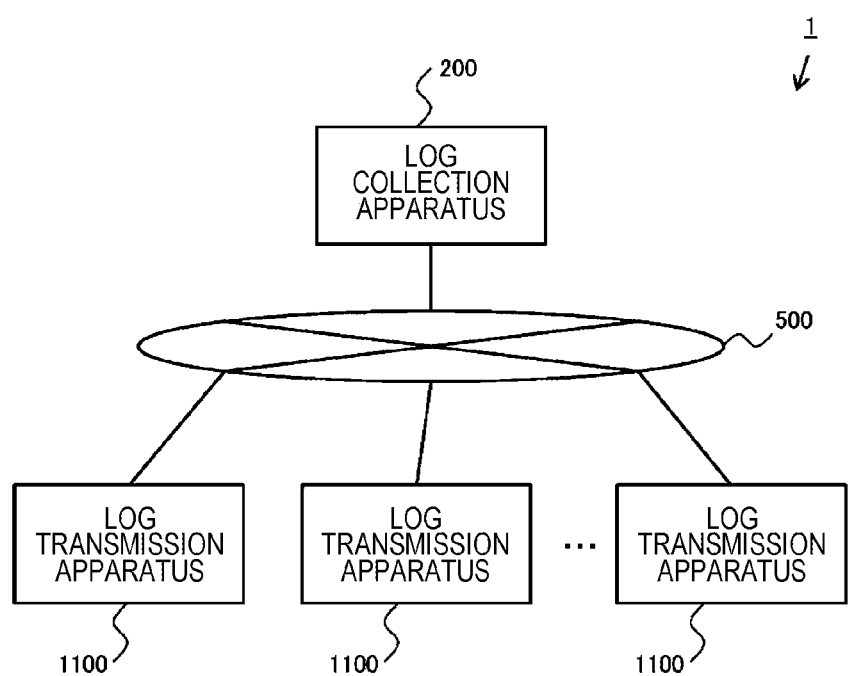
FIG. 1 is a diagram illustrating an overall configuration of a log collection system 1.

FIG. 1 is a diagram illustrating an overall configuration of a log collection system 1. The log collection system 1 includes one log collection apparatus 200 and a plurality of log transmission apparatuses 1100. The log collection apparatus 200 and the plurality of log transmission apparatuses 1100 are connected via a network 500. The network 500 is a wide area network, such as the Internet. Each of the log transmission apparatuses 1100 is, for example, a car navigation system which is configured to be installed in a vehicle. The log collection apparatus 200 is a server apparatus which collects and analyzes logs output by the log transmission apparatus 1100.

There are two types of logs transmitted from the log transmission apparatus 1100, namely, a verbose log and a summary log. Although the summary log has a smaller amount of information than that of the verbose log, the summary log includes information from which the log collection apparatus 200 can detect generation of at least some kind of failure. The verbose log includes more detailed information than that of the summary log, for example, information for investigating the cause of a failure or overcoming the failure.

The outline of the first embodiment is as follows. When detecting an abnormality from collected log information, the log collection apparatus 200 requests, for investigation of the abnormality, verbose logs from the log transmission apparatus 1100 to which a log having the detected abnormality is transmitted (hereinafter referred to as an "apparatus from which an abnormality is detected"). However, when the log collection apparatus 200 transmits a request for the verbose log, it may be considered that the verbose log cannot be transmitted, for example, when a power supply of the apparatus from which an abnormality is detected is off. Therefore, the log collection apparatus 200 requests the verbose log not only from the abnormality detecting device but also from the log transmission apparatus 1100 having the same or similar environment as the apparatus from which an abnormality is detected (hereinafter referred to as "substitute apparatus"). However, the "environment" of the log transmission apparatus 1100 is a state of the log transmission apparatus 1100 including a configuration of at least one of hardware and software. The log collection apparatus 200 analyzes the details of an abnormality using a verbose log received from the substitute apparatus. Details are described below.

(Configuration of Log Transmission Apparatus)

Figure 2:
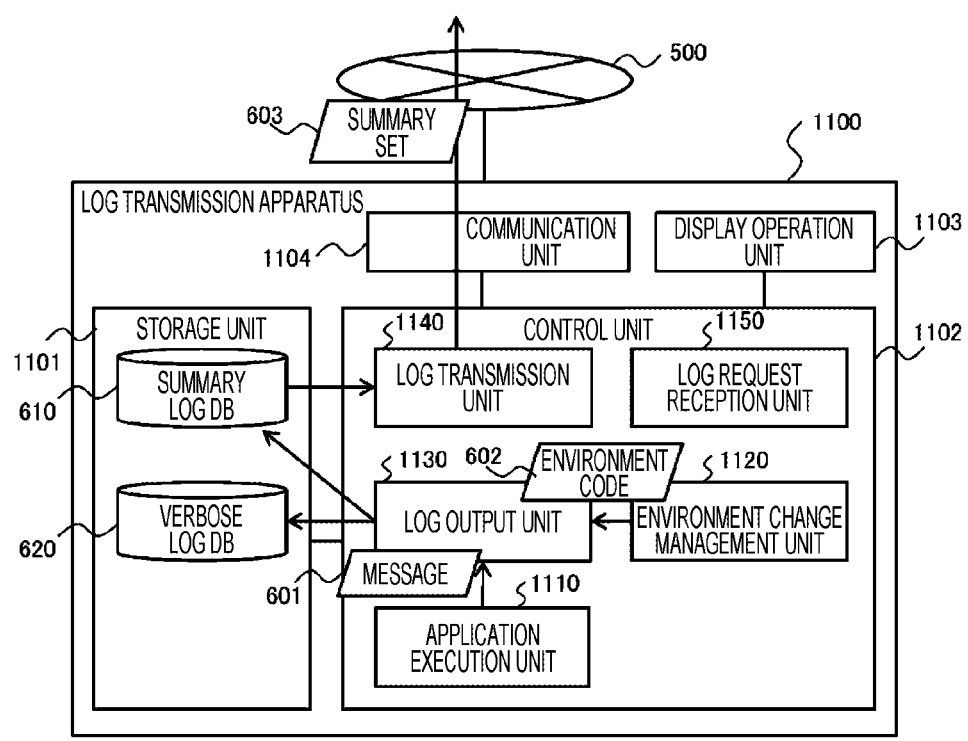
FIG. 2 is a configuration diagram of a log transmission apparatus.

FIG. 2 is a configuration diagram of the log transmission apparatus 1100. The log transmission apparatus 1100 includes a storage unit 1101 which stores a summary log DB 610 and a verbose log DB 620, a control unit 1102 which executes a series of processes in the log transmission apparatus 1100, a display operation unit 1103 which displays, for example, an execution screen for an application to receive user's operation, and a communication unit 1104 which communicates with the log collection apparatus 200. When a CPU, not illustrated, executes programs stored in a ROM, not illustrated, the control unit 1102 serves as an application execution unit 1110, an environment change management unit 1120, a log output unit 1130, a log transmission unit 1140, and a log request reception unit 1150. The display operation unit 1103 is, for example, a liquid crystal touch panel which has an information presentation function for the user and an input function for accepting the operation from the user. The display operation unit 1103 shows information on the basis of a command from the control unit 1102 and transmits the user's input to the control unit 1102.

The application execution unit 1110 executes one or more applications, for example, a destination search application, and outputs a message 601 as an operation log of each application to the log output unit 1130. The message 601 includes a verbose log and a summary log. When outputting the summary log, the application execution unit 1110 always outputs the verbose log, but in some cases, when the verbose log is output, the summary log is not output.

The environment change management unit 1120 monitors a change in the environment of the log transmission apparatus 1100 and outputs the change in the environment as an environment code 602, which is described in detail later, every time the application execution unit 1110 outputs the summary log. That is, when only the verbose log is output and the summary log is not output, the environment change management unit 1120 does not output the environment code 602. For example, when the environment of the log transmission apparatus 1100 has a hardware configuration and a software configuration, addition or removal of hardware or update of a software version is detected as an environment change by the environment change management unit 1120.

The log output unit 1130 stores the verbose log output by the application execution unit 1110, in the verbose log DB 620. The log output unit 1130 stores the summary log output by the application execution unit 1110 and the environment code 602 output by the environment change management unit 1120 in the summary log DB 610. In the following, the summary log and the environment code 602 are collectively referred to as "summary set". The configuration of the summary log DB 610 and the configuration of the verbose log DB 620 will be described later.

The log transmission unit 1140 transmits the summary set 603 stored in the summary log DB 610 to the log collection apparatus 200 at predetermined time intervals. Furthermore, the log transmission unit 1140 transmits the verbose log stored in the verbose log DB 620 to the log collection apparatus 200 on the basis of an operation command from the log request reception unit 1150.

Upon receiving a verbose log request from the log collection apparatus 200, the log request reception unit 1150 outputs the operation command to the log transmission unit 1140 to cause the log transmission unit 1140 to transmit the verbose log to the log collection apparatus 200.

Note that the application execution unit 1110, the environment change management unit 1120, the log output unit 1130, the log transmission unit 1140, and the log request reception unit 1150 may be configured to be achieved as dedicated hardware.

(Configuration of Log Collection Apparatus)

Figure 3:
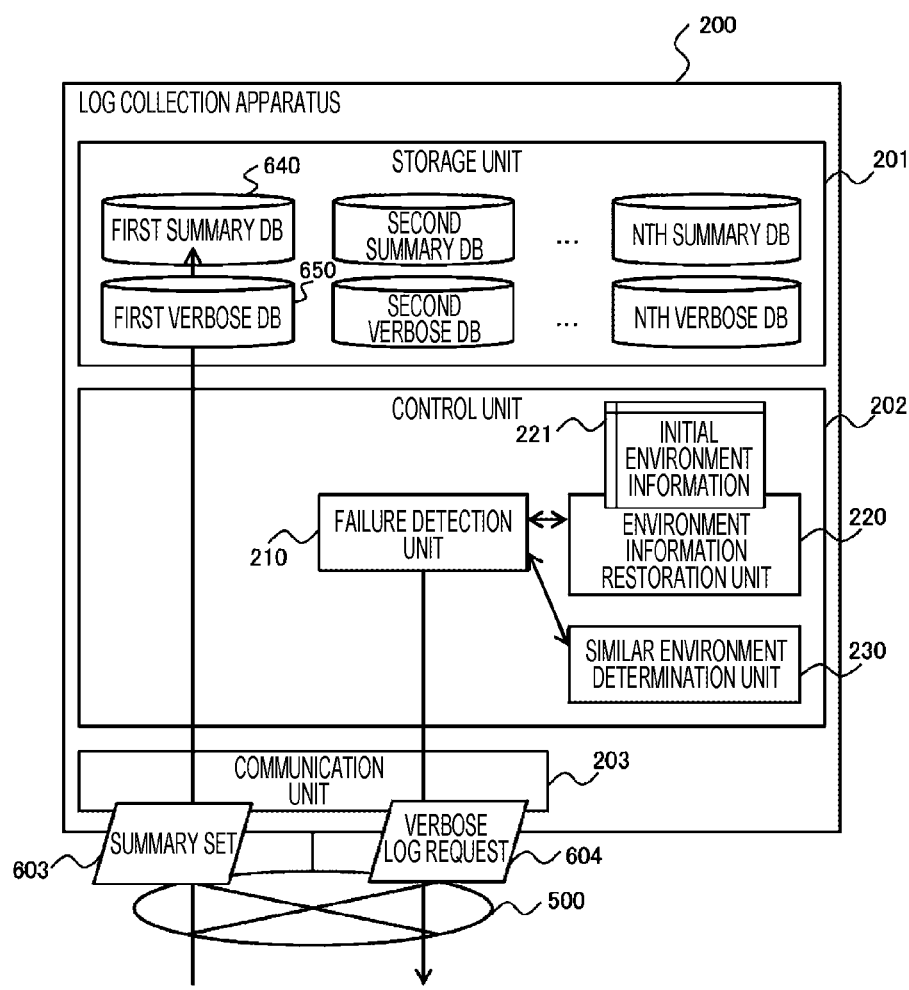
FIG. 3 is a configuration diagram of a log collection apparatus.

FIG. 3 is a configuration diagram of the log collection apparatus 200. The log collection apparatus 200 includes a storage unit 201 which stores collected logs, a control unit 202 which executes a series of processes in the log collection apparatus 200, and a communication unit 203 which communicates with a log transmission apparatus 1100. When a program stored in a ROM, not illustrated, is executed by a CPU, not illustrated, the control unit 202 serves as a failure detection unit 210, an environment information restoration unit 220, and a similar environment determination unit 230. Note that the failure detection unit 210, the environment information restoration unit 220, and the similar environment determination unit 230 may be configured to be achieved as dedicated hardware.

The failure detection unit 210 detects occurrence of a failure on the basis of a summary log received from the log transmission apparatus 1100 and transmits a verbose log request to the apparatus from which an abnormality is detected and the substitute apparatus. Detection of occurrence of a failure is determined on the basis of, for example, a status code of an HTTP response, which is described later, and a log correlation. The log correlation represents the presence of a log of response to a log of requesting and a log of a called function to a log of calling the function. For example, when the communication unit 1104 of the log transmission apparatus 1100 can use a push notification function such as short message service (SMS) or the like, the verbose log request can be transmitted by using push notification. However, transmission of the verbose log request may be achieved by repeating polling from the log transmission apparatus 1100 to the log collection apparatus.

The environment information restoration unit 220 restores environment information representing an environment (state) of each log transmission apparatus 1100 by using a history of the environment code 602 contained in the log information and initial environment information 221. The initial environment information 221 is information indicating the initial environment of each log transmission apparatus 1100, namely a factory default environment. Note that the initial environment information 221 is stored in the storage unit 201 of the log collection apparatus 200, but, in FIG. 3, the initial environment information 221 is illustrated as being provided in the environment information restoration unit 220 for the sake of convenience.

The similar environment determination unit 230 determines a log transmission apparatus 1100 having a failure and another log transmission apparatus 1100 having similar environment by using the environment information of each log transmission apparatus 1100 restored by the environment information restoration unit 220. That is, the similar environment determination unit 230 specifies a substitute apparatus for the apparatus from which an abnormality is detected by the failure detection unit 210.

In the storage unit 201, storage areas are allocated for a summary set corresponding to each log transmission apparatus 1100 connected to the log collection apparatus 200 and for a verbose log are secured. FIG. 3 illustrates a configuration of the storage unit 201 when N log transmission apparatuses 1100 are connected to the log collection apparatus 200. That is, the storage unit 201 stores N summary DBs storing a summary set transmitted from a log transmission apparatus 1100, and N verbose DBs storing a verbose log transmitted from a log transmission apparatus 1100. Each of the summary DBs has a configuration similar to that of the summary log DB 610 of a corresponding log transmission apparatus 1100, and each of the verbose DBs has a configuration similar to that of the verbose log DB 620.

(Configuration of Summary Log DB)

Figure 4:
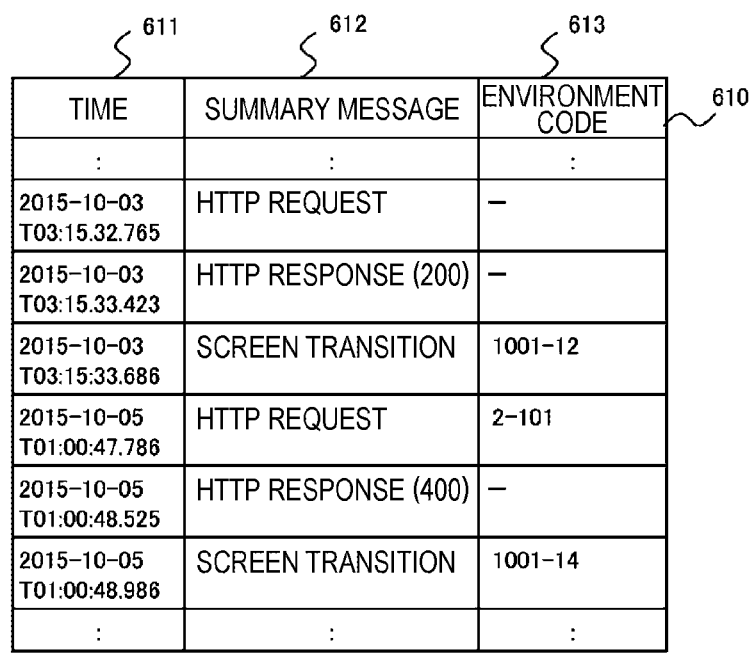
FIG. 4 is a table illustrating a configuration of a summary log DB and stored information.

FIG. 4 is a table illustrating a configuration of the summary log DB 610 and stored information. The summary log DB 610 includes three fields of time 611, summary message 612, and environment code 613. The field of time 611 stores time at which a summary log is output. The field of summary message 612 stores summary logs output by the application execution unit 1110. The field of environment code 613 stores the environment code 602 output by the environment change management unit 1120. However, when the environment does not change and the environment code 613 is not output, "-" is stored to indicate that there is no relevant information.

A log on the second line of stored information illustrated in FIG. 4 indicates that request processing (hereinafter referred to as "HTTP request") using hyper text transfer protocol (HTTP) is performed at 03:15:32.765 on Oct. 3, 2015. In addition, "-" is stored in the field of environment code 613, indicating that there is no change in environment after the last summary log was output.

A log on the third line indicates that a response (hereinafter referred to as "HTTP response") using HTTP is received approximately 0.5 seconds later, that is, at 03:15:33.423 on the same day, and the status code is 200. The status code is a code representing the outline of the HTTP response, and numbers in the 200s indicate that the processing is normally performed, and numbers in the 400s represent that the processing is not normally performed due to a problem caused by a client requesting the processing.

The field of environment code 613 in a log on the third line also stores "-", indicating that there is no change in the environment at this time. A log on the fourth line indicates that a screen transition is made approximately 0.1 second later, and further indicates that the environment of the log transmission apparatus 1100 changes and an environment code "1001-12" is output.

A log on the following fifth line indicates that an HTTP request was made two days later, that is, at 01:00:47.786 on Oct. 5, 2015, and further that the environment of the log transmission apparatus 1100 changes and an environment code "2-101" is output. A log on the sixth line indicates that an HTTP response was received approximately 1 second later, the status code is 400, and there is no change in the environment. A log on the seventh line indicates that a screen transition is made approximately 0.1 second later, and that the environment of the log transmission apparatus 1100 changes and an environment code "1001-14" is output.

(Configuration of Verbose Log DB)

FIG. 5 is a table illustrating a configuration of the verbose log DB 620 and stored information. The verbose log DB 620 includes two fields of time 621 and verbose message 622. The field of time 621 stores time at which a verbose log is output is stored. The field of verbose message 622 stores verbose logs output by the application execution unit 1110.

A log on the second line of the storage information illustrated in FIG. 5 indicates that an HTTP request is transmitted at 03:15:32. 765 on Oct. 3, 2015 by using the method "GET". Furthermore, an URL requested is specifically indicated. A log on the third line indicates that an HTTP response with the status code 200 is received, and the status code is "OK", that is, which means that the processing is normally performed. A log on the fourth line indicates that a screen transition is made and a screen ID of a transition destination is 12.

The fifth and seventh lines indicate that descriptions of some logs are omitted. A log on the sixth line indicates that software is updated from version 100 to version 101 at 05:15:33.423 on the next day.

A log on the eighth line indicates that an HTTP request is transmitted at 01:00:47.786 on Oct. 5, 2015 by using the method "GET". Furthermore, an URL requested is specifically indicated. A log on the ninth line indicates that an HTTP response with the status code 400 is received, and the meaning of the status code is "BadRequest", that is, there is a problem in the HTTP request transmitted from the log transmission apparatus 1100. A log on the tenth line indicates that a screen transition is made and a screen ID of a transition destination is 14.

When comparing the summary log DB 610 illustrated in FIG. 4 with the verbose log DB 620 illustrated in FIG. 5, the three logs on each of October 3 and October 5 of the summary log DB 610 correspond to the logs on the second to fourth lines and the logs on the eighth to tenth lines of the verbose log DB 620. That is, the summary log DB 610 does not have at least a log relating to the updating of the software.

(Environment Code) The environment code is a predetermined code indicating a change in the environment of the log transmission apparatus 1100, and is expressed by a combination of an environment ID indicating the type of changed environment and an environment value. The environment value is a value indicating a changed state of an item represented by the environment ID. The environment ID is defined by environment ID definition information. The environment ID definition information is stored in the environment change management unit 1120 of the log transmission apparatus 1100 and the environment information restoration unit 220 of the log collection apparatus 200.

FIG. 6 is a table illustrating an example of the environment ID definition information 630 indicating the meanings of the environment IDs and the environment values. As illustrated in FIG. 6, an environment ID "1" is information indicating that a hardware configuration is changed and an environment value given to the environment ID is information for specifying the changed hardware configuration. For example, the environment ID "1" having an environment value "Type-A" indicates that a hardware configuration is changed to a hardware configuration of "Type-A" separately defined. Similarly, an environment ID "2" indicates that a software version is changed, and an environment value corresponding to the environment ID "2" indicates the changed software version.

(Operation Example)

The above is the configuration of the log collection system 1. The operation of this system will be described below.

FIG. 7 is an exemplary view of a screen displayed on a display operation unit 1103 by an application execution unit 1110, as a result of making the HTTP request illustrated in FIGS. 4 and 5. FIG. 7(*a*) illustrates a result of access on Oct. 3, 2015, and FIG. 7(*b*) illustrates a result of access on Oct. 5, 2015. Both screens access the same URL "http://example.com/nearby-restaurant.html". This URL searches for restaurants located near a position from which the HTTP request is transmitted to display the restaurants.

As can be seen from the status code 200 illustrated in FIG. 4 and FIG. 5, when access is made on October 3, the processing is performed normally, and the positions of the restaurants are displayed in the display operation unit 1103, as illustrated in FIG. 7(*a*). On the other hand, as can be seen from the status code 400 illustrated in FIG. 4 and FIG. 5, when access is made on October 5, an error occurs for some reason, and as illustrated in FIG. 7(*b*), no restaurant is displayed and the contents of the error is displayed on the display operation unit 1103.

FIG. 8 illustrates diagrams of the message 601 output by the application execution unit and the environment code 602 output by the environment change management unit 1120 which are displayed when the execution screen is displayed on Oct. 5, 2015. A verbose log illustrated in FIG. 8(*a*) indicates that a request to the URL illustrated in the figure has been made by using the HTTP GET method. A summary log illustrated in FIG. 8(*b*) indicates that an HTTP request has been made. An environment code 602 illustrated in FIG. 8(*c*) indicates that the environment code is "2-101". According to the environment ID definition information 630 illustrated in FIG. 6, "2" indicates that the environment ID is the software version, "101" indicates that the environment value corresponding to the environment ID "2" is 101. In other words, the environment code 602 "2-101" indicates that the software version has changed to "101" after outputting a summary log the last time and before outputting this summary log.

(Operation of Environment Change Management Unit)

Figure 9:
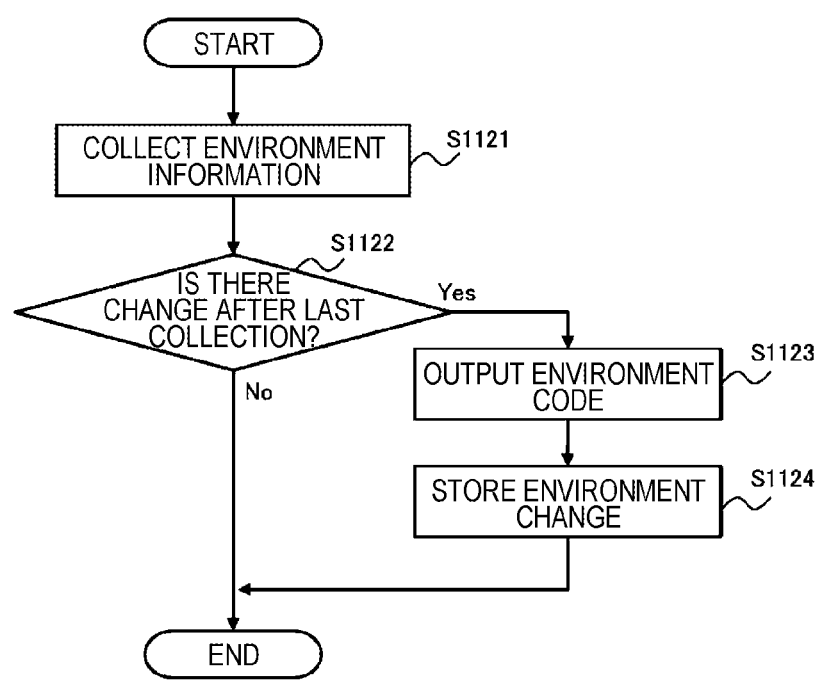
FIG. 9 is a flowchart illustrating the operation of an environment change management unit.

FIG. 9 is a flowchart illustrating the operation of the environment change management unit 1120 which generates the environment code 602. When the application execution unit 1110 outputs a summary log, the environment change management unit 1120 executes a program, the operation of which is illustrated in FIG. 9. The subject executing each step described below is a CPU, not illustrated, included in the environment change management unit 1120, namely the log transmission apparatus 1100.

Firstly, the environment change management unit 1120 collects the environment information of the log transmission apparatus 1100 (step S1121). The environment information is collected by collecting information on items defined in the environment ID definition information 630. Next, the environment change management unit 1120 compares each value of the collected environment information with the environment information previously collected and stored in the storage unit 1101, and determines whether there is a change in the environment information from the time when the information is previously collected (Step S1122). When it is determined that there is a change in the environment information, an environment code is generated by combining a changed environment ID and an environment value (step S1123), the changed environment information is stored in the storage unit 1101 (step S1124), and the flowchart of FIG. 9 is finished. When it is determined that there is no change in the environment information in step S1122, the flowchart of FIG. 9 is finished without any other operation.

FIGS. 10(*a*) and 10(*b*) are tables illustrated for comparison of the environment information generated when the HTTP request is made on Oct. 5, 2015 illustrated in FIGS. 4 and 5, and FIG. 10(*a*) represents the environment information collected in advance and stored in the storage unit 1101, and FIG. 10(*b*) represents newly collected environment information. FIGS. 10(*a*) and 10(*b*) are different in the environment value corresponding to the environment ID "2". The environment value changes to "101", and the environment code 602 results in "2-101".

(Operation of Log Output Unit)

Figure 11:
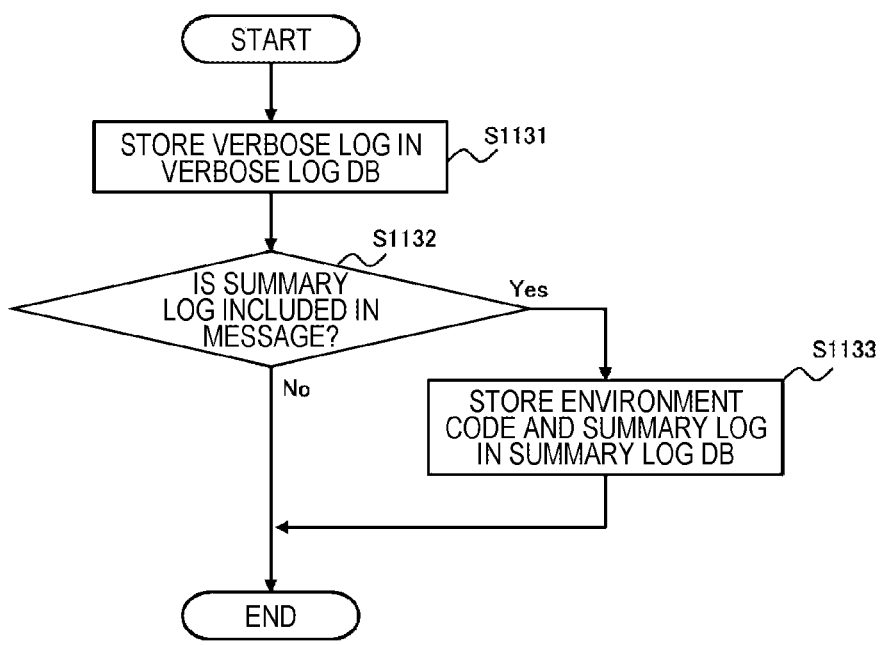
FIG. 11 is a flowchart illustrating the operation of a log output unit.

FIG. 11 is a flowchart illustrating the operation of a log output unit 1130 when receiving the message 601 from the application execution unit 1110. The subject executing each step described below is a CPU, not illustrated, included in the log output unit 1130, namely the log transmission apparatus 1100.

Firstly, the log output unit 1130 stores the verbose log included in the message 601 in the verbose log DB 620 (step S1131). Next, it is determined whether a summary log is included in the message 601 (step S1132). When it is determined that the summary log is included, the summary log included in the message 601 and the environment code 602 received from the environment change management unit 1120 are stored in the summary log DB 610 (step S1133), and the flowchart of FIG. 11 ends. In step S1132, when it is determined that the summary log is not included, the flowchart of FIG. 11 is finished without any other operation.

(Operation of Log Transmission Unit)

Figure 12:
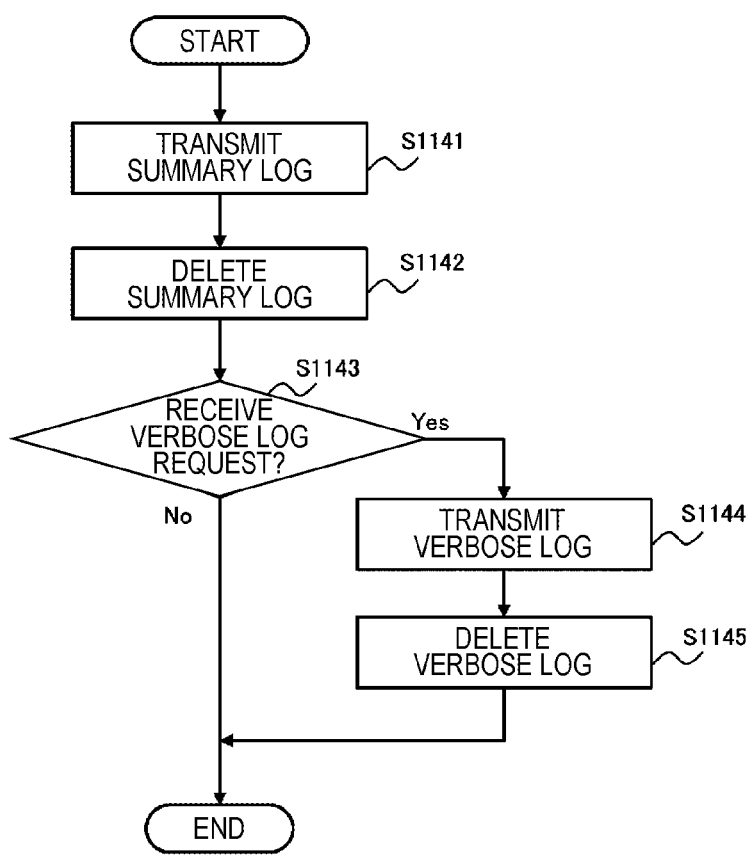
FIG. 12 is a flowchart illustrating the operation of a log transmission unit.

FIG. 12 is a flowchart illustrating the operation of a log transmission unit 1140 when transmitting the contents of the summary log DB 610 and the verbose log DB 620 stored as described above to the log collection apparatus 200. The subject executing each step described below is a CPU, not illustrated, included in the log transmission unit 1140, namely the log transmission apparatus 1100.

The log transmission unit 1140 performs the following transmission processing at regular time intervals, such as every five minutes, immediately after activation of the log transmission unit 1140, or immediately before operation stop based on an operation stop command from the user. However, the transmission processing may be executed on the basis of an operation input by the user.

Firstly, the log transmission unit 1140 transmits the contents of the summary log DB 610 to the log collection apparatus 200 (step S1141). Next, the log transmission unit 1140 deletes the contents of the summary log DB 610 (step S1142). Then, the log transmission unit 1140 confirms whether a verbose log request is received from the log collection apparatus 200 (step S1143). When it is determined that the verbose log request is received, the contents of the verbose log DB 620 are transmitted to the log collection apparatus 200 (step S1144), the contents of the verbose log DB 620 are deleted (step S1145), and the flowchart of FIG. 12 is finished. When the log transmission unit 1140 determines that the verbose log request is not received, the log transmission unit 1140 finishes the flowchart of FIG. 12 without any other operation.

The above is the operation of the log transmission apparatus 1100 when transmitting the log information. The contents of the summary log DB and the verbose log DB transmitted in this manner are stored in the storage unit 201 of the log collection apparatus 200.

(Operation of Log Collection Apparatus)

Figure 13:
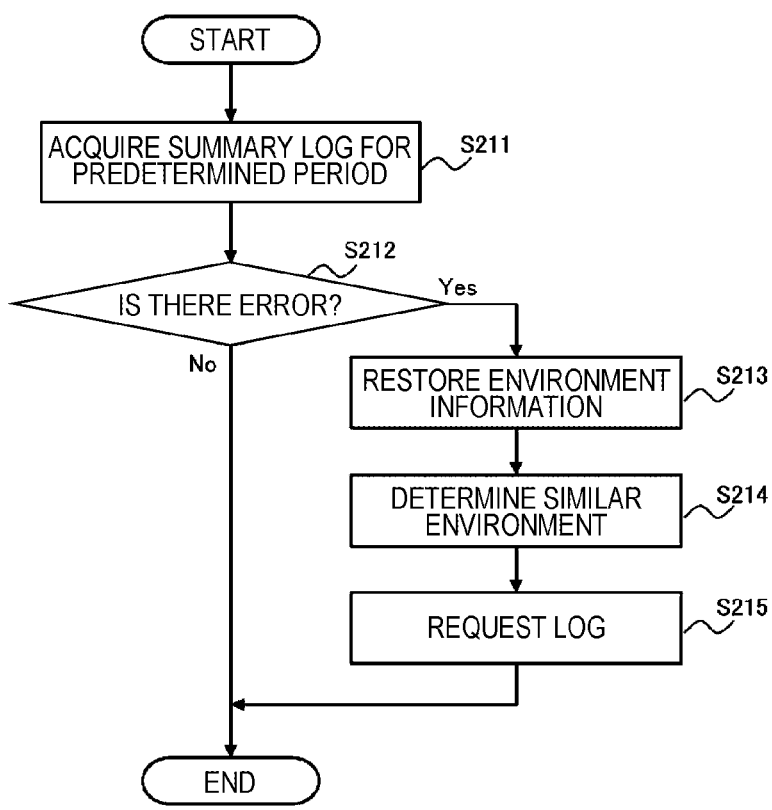
FIG. 13 is a flowchart illustrating the operation of a failure detection unit.

FIG. 13 is a flowchart illustrating the operation of the failure detection unit 210. The subject executing each step described below is a CPU, not illustrated, included in the failure detection unit 210, namely the log collection apparatus 200. The failure detection unit 210 executes processing described below for each log of each log transmission apparatus 1100 connected to the log collection apparatus 200, every predetermined time, for example, every 24 hours. Hereinafter, a first summary DB 640 and a first verbose DB 650 corresponding to a log transmission apparatus 1100 are described as an example.

Firstly, the failure detection unit 210 refers to the first summary DB 640 stored in the storage unit 201 and acquires a summary log for a predetermined period, for example, for the last 24 hours (step S211). Next, it is confirmed whether any error is included in the acquired summary log (step S212). The presence or absence of an abnormality is determined, for example, when the status code of the HTTP response has a number in the 200s, it is determined that there is no abnormality, and otherwise, it is determined there is an abnormality. When the failure detection unit 210 determines that the abnormality is included, the failure detection unit 210 restores the following environment information (step S213), and specifies a substitute apparatus on the basis of determination of a similar environment, which is described later (step S214). Then, the failure detection unit 210 transmits a verbose log request to the log transmission apparatus 1100 transmitting the log from which the abnormality is detected, namely the apparatus from which an abnormality is detected, and the substitute apparatus (step S215), and finishes the flowchart of FIG. 13. When the failure detection unit 210 determines that no abnormality is included, the failure detection unit 210 finishes the flowchart of FIG. 13 without any other operation.

(Environment Information Recovery Processing Performed by Log Collection Apparatus)

Environment information restoration processing performed by the failure detection unit 210 is processing for restoring the environment information of each log transmission apparatus 1100 to compare the environments (states) of the respective log transmission apparatuses 1100 when an abnormality is detected in a summary log acquired from any of the log transmission apparatuses 1100. In this processing, the initial environment information 221 of the log transmission apparatus 1100 for which the processing is performed is updated, that is, overwritten with the environment code 602 included in the summary set stored in the summary DB corresponding to the log transmission apparatus 1100. In other words, when there is description about a common environment ID between the initial environment information 221 and the environment code 602, priority is given to the description of the environment code 602, and description about an environment ID included in any one of the initial environment information 221 and the environment code 602 is directly restored as environment information. When an abnormality is detected from the summary log in step S212, this processing is sequentially performed for all of the log transmission apparatuses 1100.

Figure 14:
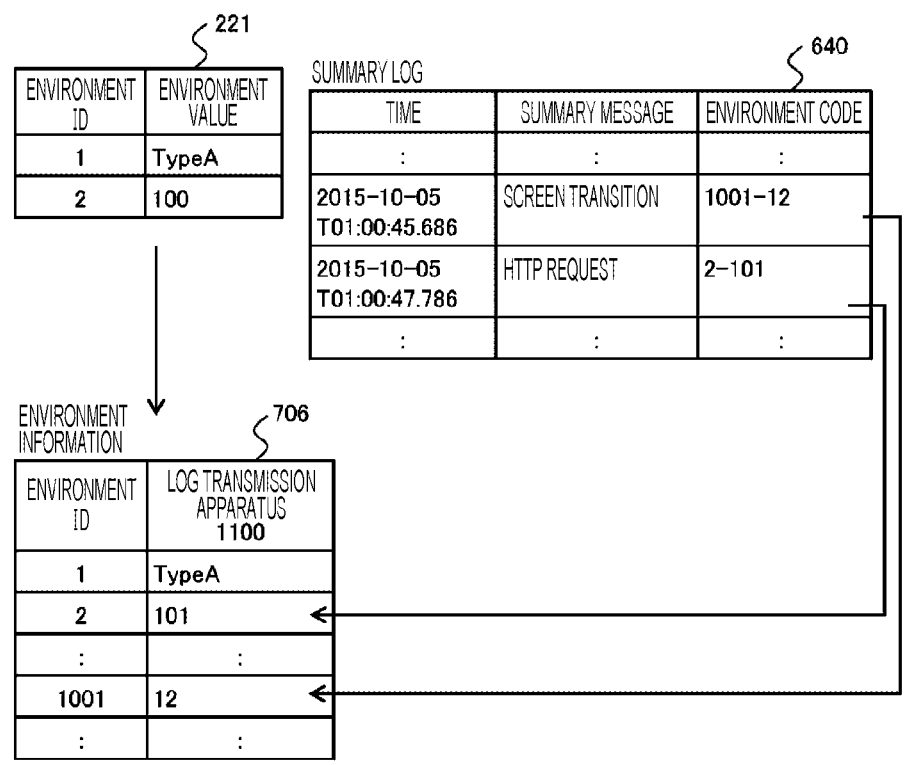
FIG. 14 is a diagram illustrating the outline of environment information restoration processing.

FIG. 14 is a diagram illustrating an example of environment information restoration processing. Here, the environment information restoration processing is described, for example, when the summary log illustrated in FIG. 4 is obtained and the failure detection unit 210 detects an abnormality in the log at 01:00:48.525 on October 5. For example, as illustrated in FIG. 14, when information corresponding to environment codes "1-TypeA" and "2-100" is included in the initial environment information 221, and the environment codes 602 included in the summary DB up to the time at which the abnormality is detected are "1001-12" and "2-101", the environment information is restored as follows. That is, the environment information including "1-TypeA", "2-101", and "1001-12" is restored. That is because the environment value corresponding to the environment code "1" is not included in the summary DB and the initial value is maintained, the environment value corresponding to the environment code "2" is changed to "101", and the environment value corresponding to the environment code "1001" is changed to "12".

(Similar Environment Determination Processing Performed by Log Collection Apparatus)

The similar environment determination processing by the failure detection unit 210 is performed, for example, as follows by using the result of the environment information restoration processing in step S213. That is, for all the log transmission apparatuses 1100 other than the apparatus from which an abnormality is detected, the weight of each item of the environment ID which is set in advance is used to calculate, as a similarity, a total value of the weight of an item of the environment ID having an environment value matching that of the apparatus from which an abnormality is detected. Then, on the basis of the height of similarity, a substitute apparatus is determined. The substitute apparatus may be one log transmission apparatus 1100 having the highest similarity or may be a predetermined number of top-ranked log transmission apparatuses 1100 having a higher similarity.

FIG. 15 illustrates exemplary tables of similar environment determination processing, in which FIG. 15(a) is a table illustrating an environment information list 706 being a list of environment information as a prerequisite for the similar environment determination processing, and FIG. 15(b) is a table illustrating a similarity calculation result table 707 indicating a processing result. The example illustrated in FIG. 15 has four log transmission apparatuses, namely a first to fourth log transmission apparatuses, and the first log transmission apparatus of the first to fourth log transmission apparatuses is the apparatus from which an abnormality is detected. As illustrated in FIG. 15(a), the respective log transmission apparatuses have different environment information, and the environment values are the same as or different from that of the first log transmission apparatus for each environment ID.

The field of "weight" illustrated in FIG. 15(b) indicates the weight of each preset environment ID. When the environment value corresponding to an environment ID matches that of the first log transmission apparatus being the apparatus from which an abnormality is detected, the weight of the environment ID is added. For example, the second log transmission apparatus has an environment value corresponding to the environment ID "1" matching that of the first log transmission apparatus, and the value of the environment ID "1" in the similarity calculation result table 707 is "10", which is the value of a weight. The second log transmission apparatus also has an environment value corresponding to the environment ID "2" matching that of the first log transmission apparatus, and the value of the environment ID "2" is "15", which is the value of a weight. However, since the second log transmission apparatus has an environment value corresponding to the environment ID "1001" not matching that of the first log transmission apparatus, the value of the environment ID "1001" in the similarity calculation result table 707 is zero. Therefore, a total of the weights, namely the similarity, of the second log transmission apparatus is "25". However, here, only a sum of the values of the environment IDs "1", "2", and "1001" are shown. Similarly, the third log transmission apparatus has a similarity of "15", and the fourth log transmission apparatus has a similarity of "16".

Therefore, when only an apparatus having the highest similarity is defined as the substitute apparatus, only the second log transmission apparatus becomes the substitute apparatus, and when the two top ranked devices having higher similarities are defined as the substitute apparatuses, the second log transmission apparatus and the fourth log transmission apparatus become the substitute apparatuses.

FIG. 16 illustrates tables showing verbose logs received from substitute apparatuses, when the two top ranked log transmission apparatuses 1100 having higher similarities, namely the second log transmission apparatus and the fourth log transmission apparatus, are defined as the substitute apparatuses. However, in FIG. 16, only the logs of the software update and the logs of access to the URL described above are shown. Since the log collection apparatus 200 is configured to obtain verbose logs of the substitute apparatuses illustrated in FIG. 16 in addition to the verbose log of the apparatus from which an abnormality is detected, the log collection apparatus 200 can predict that there is a high possibility of generation of an error when the software is updated to version 101. As described above, collecting logs of another log transmission apparatus having an environment similar to the environment in which the failure occurs enables investigation of a failure occurrence condition or a reproduction procedure.

According to the above-described first embodiment, the following operational effects can be obtained.

(1) A log transmission apparatus 1100 is connected to the log collection apparatus 200 via the network 500. The log transmission apparatus 1100 includes the application execution unit 1110 which outputs a summary log, the environment change management unit 1120 which generates an environment code 602 as information indicating a change in a state of the log transmission apparatus 1100, and the log transmission unit 1140 which transmits the summary log and the environment code to the log collection apparatus 200, in which the environment change management unit 1120 generates the environment code 602 indicating a change in the state, namely a change in the environment, of the log transmission apparatus 1100 during a period from a previous output to present output of the summary log by the application execution unit 1110.

The log transmission apparatus 1100 transmits not only the summary log but also the environment code 602 indicating the environment when this summary log is generated. Therefore, the log collection apparatus 200 receiving the summary log can represent a detailed generation condition and reproduction procedure. The environment code 602 is, as it were, differential information of the environment information of the log transmission apparatus 1100, and a storage area necessary for recording and communication amount are reduced, compared with the environment information itself, although the environment code 602 is detailed information.

Since the log transmission apparatus 1100 is configured to provide the summary log necessary for detecting a failure and the environment code 602 necessary for reproducing a state upon occurrence of an abnormality, even when a verbose log cannot be obtained from the log transmission apparatus 1100 having a failure, the log collection apparatus 200 is configured to investigate the cause of the failure by using a log of another log transmission apparatus 1100 which has a state similar to that of the log transmission apparatus 1100 having a failure when the abnormality occurs.

(2) The log transmission apparatus 1100 includes a log request reception unit, namely the communication unit 1104, which transmits a verbose log including more detailed information than the summary log, when receiving a verbose log command from the log collection apparatus 200.

Therefore, the summary log with a small amount of information which can be processed with a limited communication band and low power consumption is transmitted during normal times, and the verbose log for investigating details can be transmitted in response to a request from the log collection apparatus 200.

(3) The environment code 602 includes an item code, namely an environment ID, which indicates an item having a changed state, and a value code, namely an environment value, which indicates a changed value of the item represented by the item code.

Therefore, a change in the environment of the log transmission apparatus 1100 can be briefly represented.

(4) The log collection system 1 includes a log transmission apparatus 1100 and the log collection apparatus 200 which are connected via the network 500. The log transmission apparatus 1100 includes the application execution unit 1110 which outputs a log, the environment change management unit 1120 which generates an environment code 602 as information indicating a change in a state of the log transmission apparatus 1100, and the log transmission unit 1140 which transmits the summary log and the environment code to the log collection apparatus 200, in which the environment change management unit 1120 generates the environment code 602 indicating a change in the state, namely a change in the environment, of the log transmission apparatus 1100 during a period from a previous output to present output of the summary log by the application execution unit 1110. The log collection apparatus 200 includes the failure detection unit 210 which analyzes a summary log received from a log transmission apparatus 1100 to detect a failure, the environment information restoration unit 220 which uses the environment code 602 received from the log transmission apparatus 1100 to restore the state, namely the environment information, of the log transmission apparatus 1100, and the similar environment determination unit 230 which uses the environment information restoration unit 220 to determine another log transmission apparatus 1100 the same as or similar to an apparatus from which an abnormality is detected, in which the apparatus from which an abnormality is detected is a log transmission apparatus 1100 transmitting a summary log from which the failure detection unit 210 detects the failure.

The log collection apparatus 200 analyzes received summary logs to detect a failure and determines another log transmission apparatus 1100 the same as or similar to an apparatus from which an abnormality is detected. Therefore, comparing the summary logs with each other enables investigation of the cause of the failure in the range of the summary logs.

(5) The log collection apparatus 200 includes a log request unit, namely the failure detection unit 210, which transmits a verbose log command to the other log transmission apparatus 1100 having the same or similar environment as the apparatus from which an abnormality is detected being the log transmission apparatus transmitting the summary log from which the failure detection unit 210 detects the failure. Each log transmission apparatus 1100 includes the log request reception unit 1150 which transmits a verbose log including more detailed information than that of the summary log when receiving a verbose log request from the log collection apparatus 200.

Therefore, the log collection apparatus 200 is configured to acquire the verbose log of the other log transmission apparatus 1100 having a state the same as or similar to that of the apparatus from which an abnormality is detected. Thus, the log collection apparatus 200 is configured to investigate the influence of a difference in environment on the failure.

(First Modification)

Each log transmission apparatus 1100 may be configured to seek the user's consent of transmission of the verbose log when receiving a verbose log request and transmit the verbose log only when the user's consent is obtained. Means for requesting the user's consent of transmission of the verbose log may include making a voice inquiry using a voice output unit, not illustrated, or making a display inquiry by using the display operation unit 1103. Furthermore, a summary log not yet transmitted may be transmitted together with the verbose log request.

FIG. 17 is a diagram illustrating an example of a display inquiry by using the display operation unit 1103. In the diagram illustrated in FIG. 17, when "Yes" is selected by the user, the verbose log is transmitted, and when "No" is selected by the user, the verbose log is not transmitted.

Figure 18:
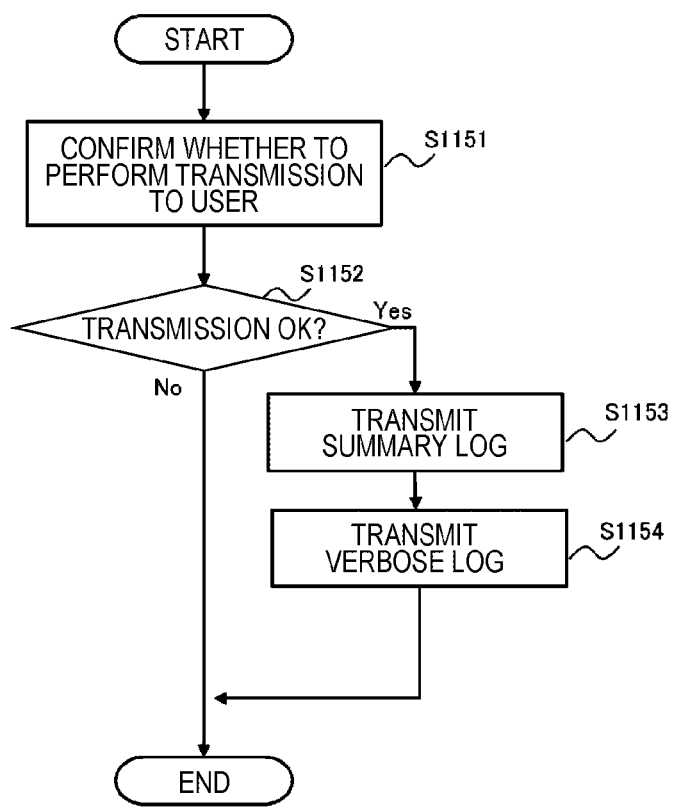
FIG. 18 is a flowchart illustrating the operation of a log request reception unit according to the first modification.

FIG. 18 is a flowchart illustrating the operation of the log request reception unit 1150 according to the first modification. The subject executing each step described below is a CPU, not illustrated, included in a log request reception unit 1150, namely a log transmission apparatus 1100.

In step S1151, an inquiry is transmitted to a user of a log transmission apparatus 1100 to confirm whether to perform transmission, that is, an inquiry is made to request the user's consent of transmission. In the following step S1152, it is determined whether a response of transmission OK, namely the user's consent, is obtained. When it is determined that a positive response is obtained, the process proceeds to step S1153, and a summary set acquired from the summary log DB 610 is transmitted. Subsequently, a verbose log acquired from the verbose log DB 1155 is transmitted, and the flowchart of FIG. 18 ends. When it is determined that a negative response is obtained in step S1152, the flowchart of FIG. 18 is finished without any other operation.

Note that when it is determined that the negative response is obtained in step S1152, the log transmission apparatus 1100 may transmit the negative response to the log collection apparatus 200 so that the log collection apparatus 200 receiving the negative response transmits the verbose log request to another log transmission apparatus 1100.

In addition, the log transmission apparatus 1100 may confirm whether the transmission of the verbose log is performed in advance before receiving the verbose log request so that the result of the confirmation is stored. In this case, the processing is performed on the basis of the stored result without performing the display illustrated in FIG. 17.

(Second Modification)

In the first embodiment described above, the environment code 602 includes the environment ID and the environment value, but the environment code 602 may further include a base ID. The base ID represents a reference code indicating a reference state of a log transmission apparatus 1100, and initial values of environment values corresponding to some environment IDs of the log transmission apparatus 1100 are defined as the base IDs. The value of the base ID and the initial value of an environment value for each environment ID in environment information corresponding to the value of the base ID are defined by the base ID definition table 710. The base ID definition table 710 is stored in both of the log collection apparatus 200 and each log transmission apparatus 1100.

FIG. 19 is a table illustrating an example of the base ID definition table 710. As illustrated in FIG. 19, in the base ID definition table 710, a combination of an environment ID and an environment value as the initial value is defined for each base ID. Although only two environment IDs are included in the base ID definition table 710 in FIG. 19, three or more environment IDs may be included, and at least one environment ID may be included.

In a second modification, when generating the first environment code 602, the environment change management unit 1120 generates an environment ID and an environment value which represent a difference between environment information of the log transmission apparatus 1100 indicated by the reference code and current environment information of the log transmission apparatus 1100. When generating the environment code 602 for the second time and after, the environment change management unit 1120 generates an environment ID and an environment value representing a change in the state of the log transmission apparatus 1100 during a period from previous output to present output of the summary log by the application execution unit 1110.

For example, in a case where the environment information upon generating the first environment code 602 by the log transmission apparatus 1100 is "1-TypeA, 2-101", when "01" is applied as the base ID, "01-2-101" is output as the environment code 602. This is because a difference in the environment information represented by the base ID "01" is the environment value corresponding to the environment ID "2". Then, when the environment information upon generating a next environment code 602 is "1-TypeB, 2-100", "01-1-TypeB" is output as the environment code 602. This is because a change in the environment information after generating the last environment code 602 is "1-TypeB".

The environment information restoration unit 220 restores the environment information of the log transmission apparatus 1100 using the base ID definition table 710 provided in the log collection apparatus 200 and a received environment code 602.

According to the second modification, the environment information of the log transmission apparatus 1100 is represented by a difference from the environment information represented by the base ID, and detailed environment information can be restored while reducing the amount of information to be recorded as a log.

(Third Modification)

In the first embodiment described above, when detecting a failure, the failure detection unit 210 of the log collection apparatus 200 transmits the verbose log request to the apparatus from which an abnormality is detected and the substitute apparatus. However, the verbose log request may be transmitted to the substitute apparatus only when the verbose log cannot be obtained from the apparatus from which an abnormality is detected. The case where the verbose log cannot be obtained from the apparatus from which an abnormality is detected means that due to, for example, an off-state of a power supply of the apparatus from which an abnormality is detected when the log collection apparatus 200 detects a failure, the log collection apparatus 200 cannot communicate with the apparatus from which an abnormality is detected and the verbose log request cannot be transmitted. Furthermore, the case where the verbose log cannot be obtained also represents that the log collection apparatus 200 can transmit the verbose log request but the verbose log is not transmitted from the apparatus from which an abnormality is detected within a predetermined time, for example, within 10 seconds. Note that when the verbose log request cannot be transmitted to the apparatus from which an abnormality is detected, the power supply may be turned on from a remote place by using a technique such as Wake On LAN.

(Fourth Modification)

In the first embodiment described above, when detecting the occurrence of a failure, the verbose log request is transmitted to the log transmission apparatus 1100, but environment information indicating occurrence of a failure may be identified by using only the summary log without transmitting the verbose log request. For example, it is possible to determine, from the summary log of the substitute apparatus, whether a failure the same as that of the apparatus from which an abnormality is detected is found, and perform the determination for a plurality of substitute apparatuses to determine environment information indicating occurrence of a failure.

(Fifth Modification)

In the first embodiment described above, the application execution unit 1110 outputs the verbose log and the summary log. However, the log output unit 1130 may generate the summary log on the basis of the verbose log output by the application execution unit 1110. For example, a template of a summary log corresponding to a verbose log is prepared in advance, and only when the verbose log corresponding to a prepared pattern is output, the log output unit 1130 generates the summary log. In this case, the environment change management unit 1120 outputs an environment code 602 only when the log output unit 1130 generates the summary log.

(Sixth Modification)

In the first embodiment described above, the "environment" of the log transmission apparatus 1100 represents at least one of the hardware configuration and the software configuration. However, the "environment" of the log transmission apparatus 1100 may include resource of the log transmission apparatus 1100, that is, the load factor of unillustrated CPU, the free space of unillustrated storage area, the usage of unillustrated RAM, or the like. The "environment" of the log transmission apparatus 1100 may further include information that may contribute to investigation of the cause of a failure, such as the temperature or operation time of the log transmission apparatus 1100.

Second Embodiment

A second embodiment of the log transmission apparatus and the log collection system will be described with reference to FIGS. 20 to 22. In the following description, the same reference numerals are given to the same constituent elements as those of the first embodiment, and a difference will mainly be described. The points not particularly described in the following are the same as those in the first embodiment. In the present embodiment, a log transmission apparatus (hereinafter referred to as "log direct transmission apparatus") including a direct communication unit communicating with the log collection apparatus 200 and a log transmission apparatus (hereinafter referred to as "log indirect transmission apparatus") including no direct communication unit communicating with the log collection apparatus 200 are combined and used, and that point is different from the first embodiment.

Figure 20:
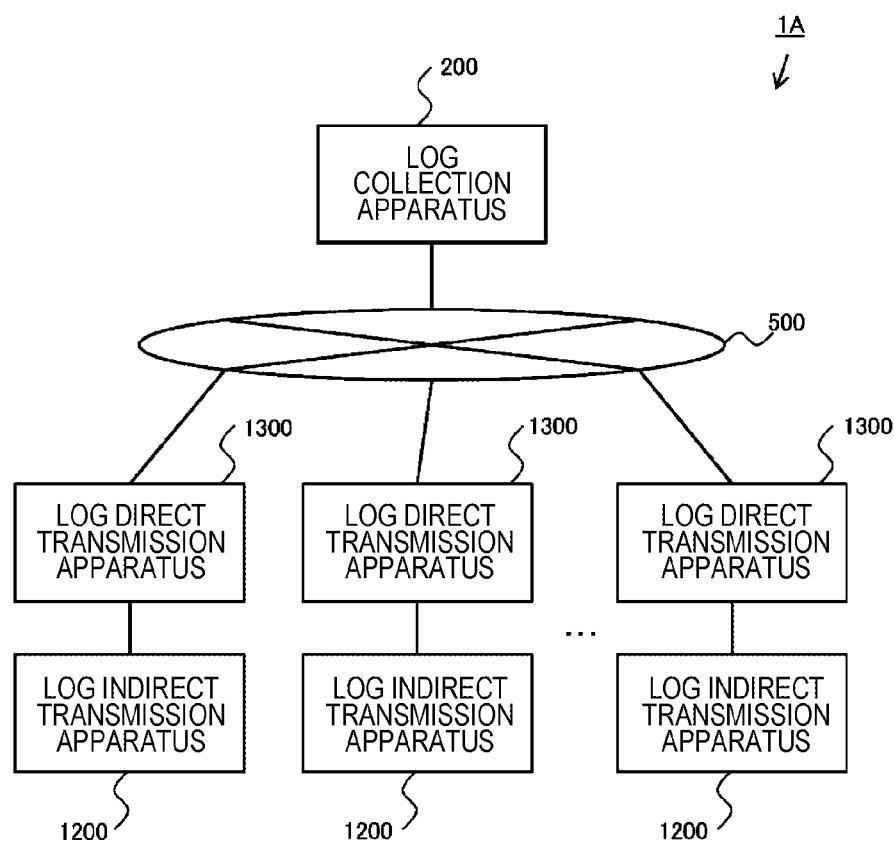
FIG. 20 is a diagram illustrating an overall configuration of a log collection system according to a second embodiment.

FIG. 20 is a diagram illustrating an overall configuration of a log collection system 1A according to a second embodiment. The log collection system 1A includes one log collection apparatus 200, a plurality of log indirect transmission apparatus 1200, and a plurality of log direct transmission apparatuses 1300. Each of the log direct transmission apparatuses 1300 is connected to the log collection apparatus 200 via a network 500. Each of the log indirect transmission apparatuses 1200 is connected to the log collection apparatus 200 via the log direct transmission apparatus 1300 and the network 500. The log indirect transmission apparatus 1200 is, for example, a car navigation system which is configured to be installed in a vehicle. The log direct transmission apparatus 1300 is, for example, a mobile phone, a smartphone, or a dedicated communication module.

Since the configuration and operation of the log collection apparatus 200 are the same as those of the first embodiment, a description thereof will be omitted.

Figure 21:
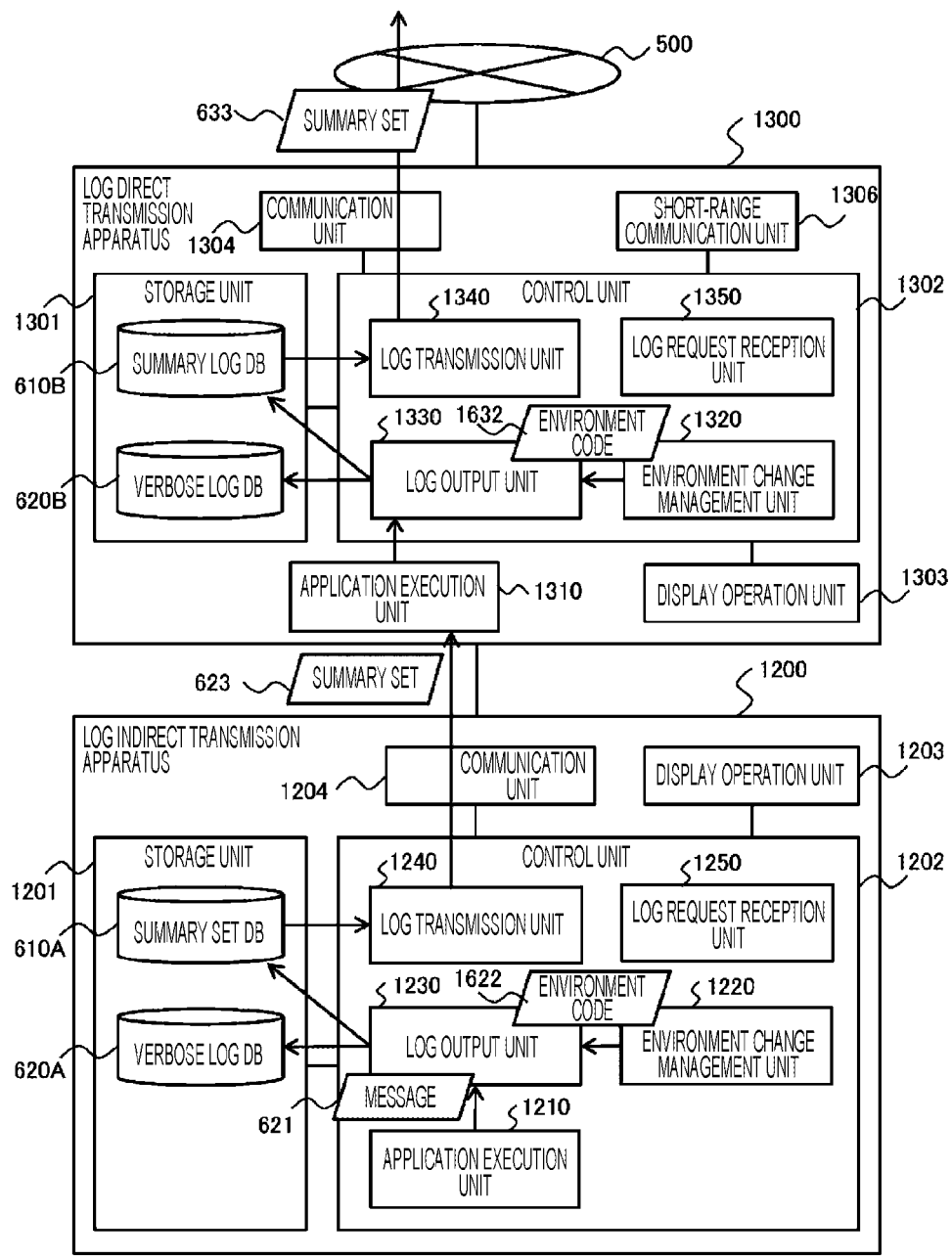
FIG. 21 is a diagram illustrating configurations of a log indirect transmission apparatus and a log direct transmission apparatus.

FIG. 21 is a diagram illustrating configurations of the log indirect transmission apparatus 1200 and the log direct transmission apparatus 1300. The configurations and operations of the log indirect transmission apparatus 1200 and the log direct transmission apparatus 1300 are the same as those of the log transmission apparatus 1100 in the first embodiment, unless otherwise specified. That is, as described in the first embodiment, the log indirect transmission apparatus 1200 transmits a summary set 623 at predetermined time intervals. As will be described later, the summary set 623 to which an environment code 1632 of the log direct transmission apparatus 1300 is added is transmitted to the log collection apparatus 200.

The log indirect transmission apparatus 1200 is different from the log transmission apparatus 1100 according to the first embodiment in that the communication destination of a communication unit 1204 is limited. The communication unit 1204 communicates with a short-range communication unit 1306 of the log direct transmission apparatus 1300. The communication unit 1204 and the short-range communication unit 1306 communicates with each other by using Bluetooth (registered trademark), Wi-Fi (registered trademark), or the like. That is, the log indirect transmission apparatus 1200 outputs, as the summary set 623, a summary log output by the application execution unit 1110 and an environment code 1622 output by the environment change management unit 1220, to the log direct transmission apparatus 1300.

The log direct transmission apparatus 1300 is different from the log transmission apparatus 1100 according to the first embodiment in that the short-range communication unit 1306 is further provided. Applications executed by an application execution unit 1310 include a transfer application, which is described later. Furthermore, a communication unit 1304 corresponds to a plurality of communication standards, and the change of communication standards to be used is reflected in the environment code 1632. For example, an environment ID "2001" indicates that a communication standard used by the communication unit 1304 is changed, and when the value of the environment ID "2001" is "zero", it indicates that the communication standard is switched to 3G, and when the value is "1", it indicates that the communication standard is switched to LTE.

The short-range communication unit 1306 communicates with the log indirect transmission apparatus 1200 by using Bluetooth (registered trademark), Wi-Fi (registered trademark), or the like. An operation of the short-range communication unit 1306 is switched between an on state and off state on the basis of a user's instruction or the like. When the operation of the short-range communication unit 1306 is switched to the off state, communication with the log indirect transmission apparatus 1200 is disabled, but the power consumption of the log direct transmission apparatus 1300 is reduced. When the operation of the short-range communication unit 1306 is switched to the on state, communication with the log indirect transmission apparatus 1200 is allowed, but the power consumption of the log direct transmission apparatus 1300 increases. A change in the operation state of the short-range communication unit 1306 is reflected in the environment code 1632. For example, an environment ID "2002" indicates that the operation state of the short-range communication unit 1306 is changed, and when the value of the environment ID "2002" is "zero", it indicates that the operation of the short-range communication unit 1306 is switched to the off state, and when the value is "1", it indicates that the operation of the short-range communication unit 1306 is switched to the on state.

The transfer application acquires the summary set 623 output from the log indirect transmission apparatus 1200 and outputs the contents of the summary set 623, as a summary log of the application, to a log output unit 1330. Similarly to the log indirect transmission apparatus 1200, the log direct transmission apparatus 1300 also adds the environment code 1632 output by an environment change management unit 1320 to the summary log output by the application execution unit 1310 and generates a summary set. That is, when an application execution unit 1210 of the log indirect transmission apparatus 1200 outputs the summary log, the environment code 1622 of the log indirect transmission apparatus 1200 and the environment code 1632 of the log direct transmission apparatus 1300 are added thereto, and a summary set 633 is formed. However, since there are applications executed by the application execution unit 1310, not limited to the transfer application for processing the summary set 623, some of the summary sets 633 output from the log direct transmission apparatus 1300 may not include the environment code 1622 of the log indirect transmission apparatus 1200.

Upon receiving a verbose log request from the log collection apparatus 200, a log request reception unit 1350 not only transmits a verbose log stored in a verbose log DB 620B to the log collection apparatus 200, but also transmits the verbose log request to the log indirect transmission apparatus 1200. In response to this request, the verbose log transmitted from the log indirect transmission apparatus 1200 is also transmitted to the log collection apparatus 200. However, when communication with the log indirect transmission apparatus 1200 cannot be performed due to, for example, the off state of the operation of the short-range communication unit 1306, the verbose log request is not transmitted to the log indirect transmission apparatus 1200.

Figure 22:
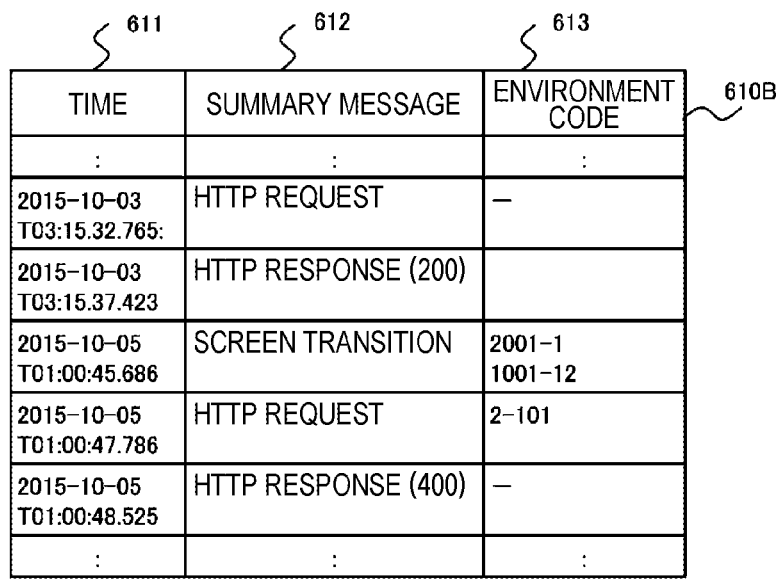
FIG. 22 is a table illustrating a configuration of a summary log DB and stored information.

FIG. 22 is a table illustrating a configuration of a summary log DB 610B and stored information. FIG. 22 illustrates logs based on the operation of the transfer application, that is, logs based on the summary sets 623 output from the log indirect transmission apparatus 1200. As illustrated in FIG. 22, the environment code 1622 generated by the log indirect transmission apparatus 1200 and the environment code 1632 generated by the log direct transmission apparatus 1300 are added to a summary message output by the application execution unit 1210 of the log indirect transmission apparatus 1200. For example, a log on the fifth line indicates an environment code "2001-1", that is, the communication standard to be used by the communication unit 1304 of the log direct transmission apparatus 1300 is switched to LTE during a period from receiving an HTTP response to transition of a screen. Therefore, the log collection apparatus 200 can obtain not only the environment information of the log indirect transmission apparatus 1200 but also the environment information of the log direct transmission apparatus 1300.

According to the above-described second embodiment, the following operational effects can be obtained.

(1) Each log direct transmission apparatus 1300 includes the short-range communication unit 1306 which communicates with another log transmission apparatus, that is, a log indirect transmission apparatus 1200. The application execution unit 1310 outputs a summary log received from the log indirect transmission apparatus 1200 and an environment code 1622 received from the log indirect transmission apparatus 1200, as a summary log.

Therefore, the log direct transmission apparatus 1300 transmits, to the log collection apparatus 200, a summary set 633 obtained by adding an environment code 1632 output by the environment change management unit 1320 to the summary log and environment code 1622 received from the log indirect transmission apparatus 1200. Thus, the log collection apparatus 200 can also restore not only the environment information of the log indirect transmission apparatus 1200 but also the environment information of the log direct transmission apparatus 1300.

(2) The log direct transmission apparatus 1300 includes the log request reception unit 1350 which outputs a verbose log command received from the log collection apparatus 200 to the log indirect transmission apparatus 1200, and transmits a verbose log received from the log indirect transmission apparatus 1200 to the log collection apparatus 200.

Therefore, the log collection apparatus 200 can acquire not only the verbose log of the log direct transmission apparatus 1300 but also the verbose log of the log indirect transmission apparatus 1200.

(3) Operation of the short-range communication unit 1306 is switchable between an on state and off state, and the switching of the operation state of the short-range communication unit is reflected in the environment code 1632 output by the environment change management unit 1320. Therefore, when a problem arises due to the off state of the operation of the short-range communication unit 1306, it is easy to investigate the cause thereof.

First Modification of Second Embodiment

The log indirect transmission apparatus 1200 may transmit the verbose log to the log direct transmission apparatus 1300 without receiving the verbose log request. The log indirect transmission apparatus 1200 may transmit the verbose log to the log direct transmission apparatus 1300 at any timing, for example, every predetermined time intervals or every time the verbose log is output from the application execution unit 1210.

Upon receiving the verbose log from the log indirect transmission apparatus 1200 at timing at which the verbose log request is not received, the log direct transmission apparatus 1300 does not transmit the verbose log to the log collection apparatus 200 but stores the verbose log in the verbose log DB 620B. When the verbose log request is received from the log collection apparatus 200, the verbose log is transmitted to the log collection apparatus 200.

According to this modification, even when the log collection apparatus 200 transmits the verbose log request while the log indirect transmission apparatus 1200 cannot communicate with the log direct transmission apparatus 1300, the log collection apparatus 200 can obtain the verbose log which has been transmitted to the direct transmission apparatus 1300 by the log indirect transmission apparatus 1200. The present modification is particularly effective when the log indirect transmission apparatus 1200 and the log direct transmission apparatus 1300 are not always used at the same place or when power of the log indirect transmission apparatus 1200 is often turned off. The present modification is particularly effective when the log indirect transmission apparatus 1200 is a car navigation system installed in a vehicle and the log direct transmission apparatus 1300 is a mobile terminal.

Second Modification of Second Embodiment

Each log indirect transmission apparatus 1200 may be configured to seek the user's consent of transmission of the verbose log when receiving a verbose log request and transmit the verbose log only when the user's consent is obtained. At this time, to request the user's consent of transmission of the verbose log, an inquiry may be displayed on a display operation unit 1203 of the log indirect transmission apparatus 1200 or on a display operation unit 1303 of the log direct transmission apparatus 1300.

Furthermore, the verbose log request may be transmitted together with a summary log not yet transmitted.

Although the programs are stored in the ROM, not illustrated, the programs may be stored in a nonvolatile memory, not illustrated. In addition, each log transmission apparatus 1100 may include an input/output interface, not illustrated, to read a program from another apparatus via a medium used by the input/output interface and the log transmission apparatus 1100 when necessary. Here, the medium represents, for example, a storage medium detachable from an input/output interface, a communication medium, such as, a wired, wireless, or optical network, or a carrier wave or a digital signal propagating through the network. In addition, some or all of functions achieved by the programs may be achieved by a hardware circuit or an FPGA.

The embodiments and modifications described above may be combined to each other.

Various embodiments and modifications have been described above, but the present invention is not limited thereto. Other embodiments conceivable within the technical scope of the present invention are also included in the scope of the present invention.

This application claims priority from the following disclosure, and the entire contents of which are incorporated herein by reference.

Japanese Patent Application No. 2016 177323 (filed on Sep. 12, 2016)

REFERENCE SIGNS LIST 1, 1A log collection system
1100 log transmission apparatus
200 log collection apparatus
210 failure detection unit
220 environment information restoration unit
230 similar environment determination unit
602, 1622, 1632 environment code
603, 623, 633 summary set
612 summary message
622 verbose message
630 environment ID definition information
710 base ID definition table
1100 log transmission apparatus
1110, 1210, 1310 application execution unit
1120, 1220, 1320 environment change management unit
1140, 1240, 1340 log transmission unit
1150, 1250, 1350 log request reception unit
1200 log indirect transmission apparatus
1300 log direct transmission apparatus
1306 short-range communication unit

The invention claimed is:

1. A log transmission apparatus connected to a log collection apparatus via a communication network comprising:
a memory;
an input/output device; and
a processor communicatively coupled to the memory and the input/output device, wherein the processor is configured to
output a log;
generate an environment code as information indicating a change in a state of the log transmission apparatus; and
transmit the log and the environment code to the log collection apparatus,
generate the environment code which indicates the change in the state during a period from a previous output to present output of the log.

2. The log transmission apparatus according to claim 1, wherein the processor is further configured to
transmit a verbose log including more detailed information than the log, when receiving a verbose log command from the log collection apparatus.

3. The log transmission apparatus according to claim 1, wherein the environment code includes an item code which indicates an item having a changed state, and a value code which indicates a changed value of the item represented by the item code.

4. The log transmission apparatus according to claim 1, wherein
wherein the processor collects a value of an item of a state of the log transmission apparatus, determines whether the collected value changes from a value previously collected, and generates the environment code when determining that the collected value changes from the value previously collected.

5. The log transmission apparatus according to claim 1, wherein
the processor communicates with another log transmission apparatus via the communication network,
the processor outputs, as the log, the log received from the other log transmission apparatus and the environment code received from the other log transmission apparatus.

6. The log transmission apparatus according to claim 5, wherein
the processor outputs the verbose log command to the other log transmission apparatus, when receiving a verbose log command from the log collection apparatus, and transmits a verbose log including detailed information than the log received from the other log transmission apparatus to the log collection apparatus.

7. The log transmission apparatus according to claim 5, wherein
operation of a short-range communication network is switchable between an on state and off state, and
a change in the state includes the switching of the operation of the processor.

8. The log transmission apparatus according to claim 1, wherein
the processor generates the environment code which indicates a difference between a state of the log transmission apparatus serving as a reference indicated by a reference code and a current state of the log transmission apparatus, when generating the environment code for the first time.

9. A log collection system comprising:
a plurality of log transmission apparatuses; and
a log collection apparatus,
the log transmission apparatuses and the log collection apparatus being connected via a communication network,
wherein each of the log transmission apparatuses includes:
a memory;
an input/output device; and
a processor communicatively coupled to the memory and the input/output device, wherein the processor is configured to
output a log;
generate an environment code as information indicating a change in a state of the log transmission apparatus; and
transmit the log and the environment code to the log collection apparatus,
generate the environment code which indicates the change in the state during a period from a previous output to present output of the log, and
the log collection apparatus includes:
a second memory; and
a second processor communicatively coupled to the second memory, wherein the second processor is configured to
analyze the log received from the log transmission apparatus to detect a failure;
restore the state of the log transmission apparatus by using the environment code received from the log transmission apparatus, and
determine another log transmission apparatus having a state the same as or similar to that of an apparatus from which an abnormality is detected being the log transmission apparatus transmitting the log from which a failure is detected by the second processor, by using the state of the log transmission apparatus restored.

10. The log collection system according to claim 9, wherein
the second processor transmits a verbose log command to the other log transmission apparatus determined to have a state the same as or similar to that of the apparatus from which an abnormality is detected, and
the processor when receiving the verbose log command from the log collection apparatus, transmits a verbose log including detailed information than the log.

11. The log collection system according to claim 10, wherein
the processor transmits the verbose log command to the other log transmission apparatus determined to have a state the same as or similar to that of the apparatus from which an abnormality is detected, when the verbose log is not obtained from the apparatus from which an abnormality is detected.

12. The log collection system according to claim 9, wherein
the environment code includes an item code which indicates an item having a changed state, and a value code which indicates a changed value of the item represented by the item code.

13. The log collection system according to claim 9, wherein
the processor collects a value of an item of a state of the log transmission apparatus, determines whether the collected value changes from a value previously collected, and generates the environment code when determining that the collected value changes from the value previously collected.

14. The log collection system according to claim 9, wherein
the processor of each of the plurality of log transmission apparatuses are classified into a log indirect transmission apparatus connected to the communication network via another log transmission apparatus and a log direct transmission apparatus connected to the communication network not via another log transmission apparatus, the processor communicates with the log indirect transmission apparatus via the communication network; and
the processor, when receiving a verbose log command from the log collection apparatus, outputs a verbose log command to the log indirect transmission apparatus, and transmits a verbose log including detailed information than the log received from the log indirect transmission apparatus to the log collection apparatus.

15. The log collection system according to claim 9, wherein
the processor of the log transmission apparatus generates the environment code which indicate a difference between a state of the log transmission apparatus serving as a reference indicated by a reference code and a current state of the log transmission apparatus, when generating the environment code for the first time.

* * * * *